United States Patent
Wilk

[11] Patent Number: 5,818,866
[45] Date of Patent: Oct. 6, 1998

[54] METHOD OF SELECTING PROPAGATION DELAYS RETAINED FOR RECEIVING MESSAGES TRANSMITTED BY SPREAD SPECTRUM RADIO COMMUNICATION

[75] Inventor: Heinz Wilk, Versailles, France

[73] Assignee: Matra Communication, France

[21] Appl. No.: 683,886

[22] Filed: Jul. 19, 1996

[30] Foreign Application Priority Data

Jul. 25, 1995 [FR] France .................................. 95 09012

[51] Int. Cl.$^6$ .................................................. H04J 13/02
[52] U.S. Cl. .......................... 375/200; 455/67.1; 455/63; 455/67.3; 455/132; 375/254; 375/285; 375/346
[58] Field of Search ..................... 375/200, 254, 375/285, 346, 347; 333/142; 327/395, 400; 370/517, 519; 455/63, 67.1, 67.3, 501, 504, 506, 65, 132, 133; 380/33

[56] References Cited

U.S. PATENT DOCUMENTS

| | | | |
|---|---|---|---|
| 5,237,586 | 8/1993 | Bottomley | 375/200 |
| 5,289,499 | 2/1994 | Weerackody | 375/200 |
| 5,305,349 | 4/1994 | Dent | 375/200 |
| 5,361,276 | 11/1994 | Subramanian | 375/200 |
| 5,448,600 | 9/1995 | Lucas . | |
| 5,563,610 | 10/1996 | Reudink | 342/375 |
| 5,581,547 | 12/1996 | Umeda et al. | 370/342 |
| 5,646,958 | 7/1997 | Tsujimoto | 375/233 |
| 5,671,221 | 9/1997 | Yank | 370/320 |

OTHER PUBLICATIONS

"Architecture Simplifications for an Improved Performance Rake Receiver" Le Strat E., pp. 726–729.
Proakis, J.G. "Digital Communications", 1989 pp. 728–734.

*Primary Examiner*—Wellington Chin
*Assistant Examiner*—Jean B. Corrielus
*Attorney, Agent, or Firm*—Evenson, McKeown, Edwards & Lenahan, P.L.L.C.

[57] ABSTRACT

The signal received in a CDMA system is sampled at a rate greater than the chip rate of the spreading sequences. In order to assign the propagation delays to the arms of a rake receiver, consecutive delays are tested within a time window by evaluating, for each delay tested, an energy of the correlation between the signal received and a reference spreading sequence to which said tested delay is applied. A selection threshold is determined from the largest of the energies evaluated. A first list is compiled containing delays from the window for which the histogram of the evaluated energies exhibits a local maximum greater than the selection threshold, and a second list is compiled containing delays neighboring the delays of the first list. The delays assigned to the arms of the rake receiver are selected initially from the first list and then, if this is insufficient, from the second list.

7 Claims, 7 Drawing Sheets

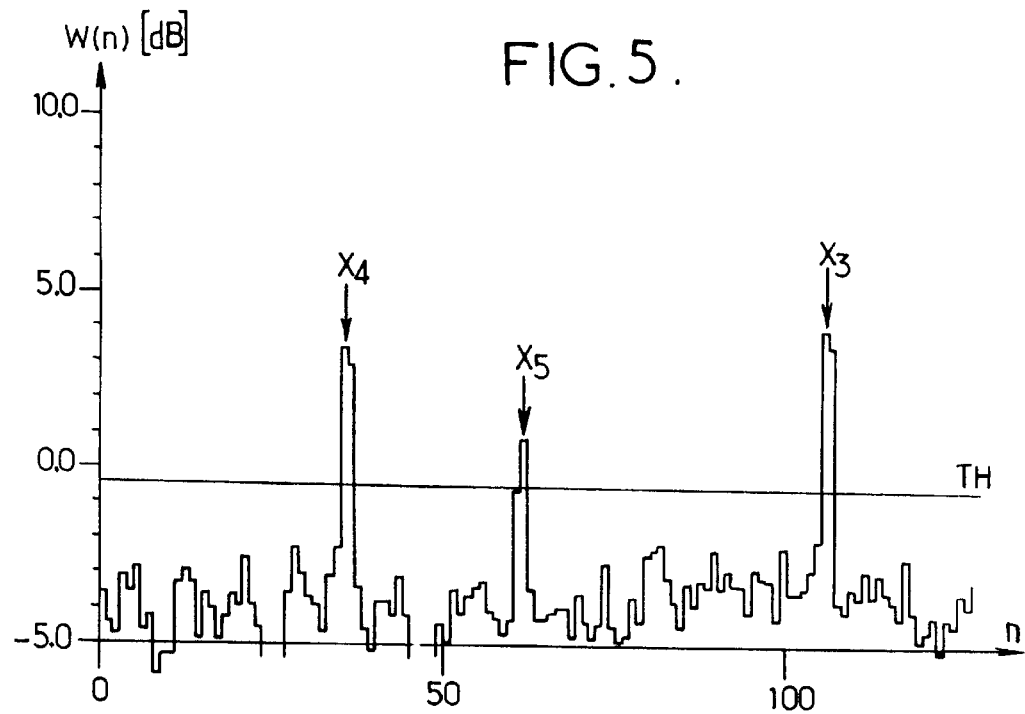
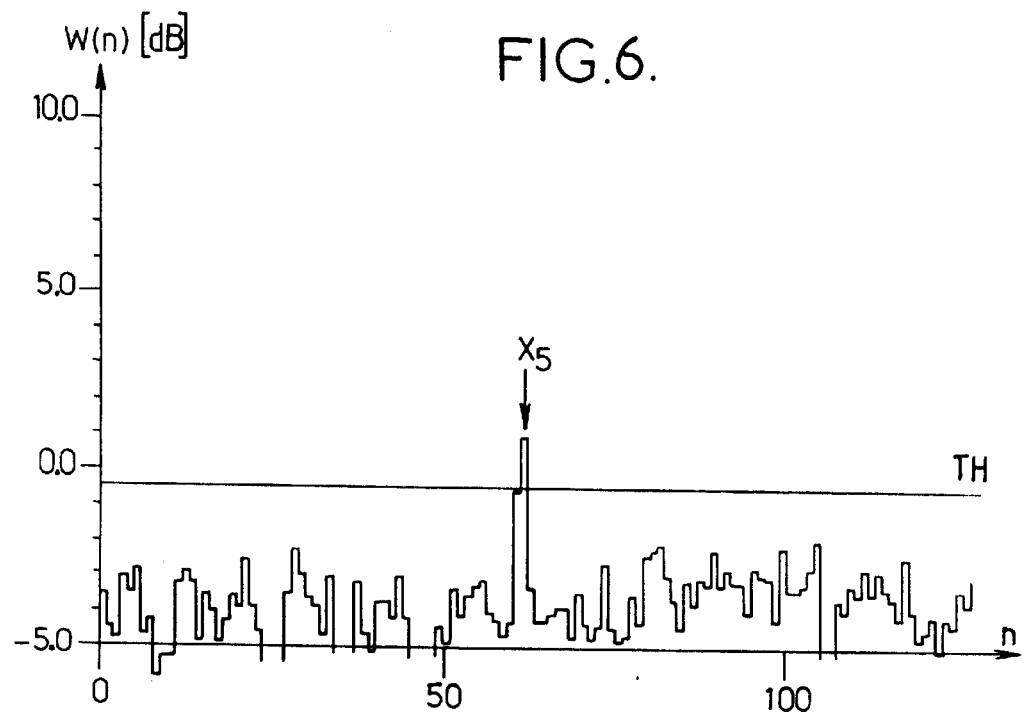

METHOD OF SELECTING PROPAGATION DELAYS RETAINED FOR RECEIVING MESSAGES TRANSMITTED BY SPREAD SPECTRUM RADIO COMMUNICATION

BACKGROUND OF THE INVENTION

The present invention relates to the field of direct sequence spread spectrum (DSSS) radio communications. It applies in particular to code division multiple access (CDMA) radio telephony systems.

CDMA is a mode of digital communication with spread spectrum in which various transmission channels are created by using, for each channel, spreading sequences which modulate the information bits to be transmitted. The spreading sequences have a rate greater than that of the information bits in order to spread the spectrum of the radio signal. Their auto- and cross-correlation properties are made suitable to allow the multiplexing of the various channels: they are in general mutually orthogonal or quasi-orthogonal, pseudo-random sequences taking the values −1 or +1. These sequences are often complex, that is to say they comprise two real sequences which modulate the same binary stream and which are modulated by two quadrature carrier waves.

The use of CDMA in the field of cellular radio telephony is described in Chapter I of the work "Mobile radio communications" by Raymond Steele, Pentech Press, London 1992, and also in the article "On the system design aspects of code division multiple access (CDMA) applied to digital cellular and personal communications networks", by A. Salmasi and K. S. Gilhousen, Proc. of the 41st IEEE Vehicular Technology Conference, St Louis, Mo., 19–22 May 1991, and in patent U.S. Pat. No. 5,103,459.

For the downlink, the multiplexed transmission channels are formed at the level of the base station of each cell of the network. Each mobile station located in the cell uses a particular spreading sequence in order to retrieve, from the overall radio signal emitted by the base station, the information bits which are intended for it. One of the CDMA channels of the down link is a pilot channel on which the base station emits a reference sequence with no modulation of information bits. Reception on the pilot channel makes it possible for the mobile stations to synchronize with one another and to evaluate the response of the propagation channel so as to ensure coherent demodulation on the other channels.

For the uplink, each mobile station emits a radio signal formed using a particular spreading sequence. Correlation with this sequence enables the base station to retrieve the information bits transmitted by the mobile station, from the radio signals received from various mobile stations in the cell. There is no pilot channel in the signal emitted by a mobile station.

For most radio communication systems, the multiple propagation paths between the emitting and receiving stations constitute a tricky problem, in particular because they give rise to signal fading (Rayleigh fading). An important advantage of CDMA is that it lessens the drawbacks related to the multiple paths, by virtue of the spreading of the signal spectrum.

With CDMA, it is even possible to profit from the existence of the multiple paths in order to improve reception performance, by space diversity techniques. A rake receiver is then used, each arm of which provides for the reception of the same signals along a selected propagation path. Each path is identified by a delay which is applied to the spreading sequence in order to determine a correlation between the signal received and the delayed sequence. The correlations obtained in various arms of the receiver can then be combined to restore the information bits transmitted.

This space diversity technique is explained in the patent U.S. Pat. No. 5,109,390. In the system described in this document, one of the arms of the rake receiver serves to scan the time domain in order to search for new propagation paths. The purpose of this search is to select with respect to reception the paths/delays for which the energy of the signal received after correlation is greatest. The delays are tested sequentially within a predefined time window by determining their associated energy. Each tested delay corresponds to a shift by an integer or fractional number of samples or "chips" of the spreading sequence which is applied to the latter in order to compute the correlation. The time window of the tested delays typically has a duration of the order of 100 μs, this representing a propagation over around 30 km. Once a delay has been selected and assigned to an arm of the rake receiver, the corresponding path is tracked by means of a tracking loop, of the Costas loop type, included within this arm. An example of such a loop is described in the article "Theory of Spread-Spectrum Communications—A Tutorial" by R. L. Pickholtz et al., IEEE Trans. on Communications, Vol. COM-30, No. 5, May 1982.

In the histogram of the evaluated energies versus the delays tested in the time window, each propagation path appears as a pulse whose temporal width is proportional to the inverse of the width of the transmission passband. To improve the resolution in the estimation of the delays, the baseband received signal is oversampled, that is to say is digitized at a rate $f_s=1/T_s$ which is a multiple of the chip rate $f_c=1/T_c$ of the spreading sequences: $f_s=M \cdot f_c$. The main lobe of the impulse response of the overall transmission system, assuming a single propagation path, then has a width of several samples. When a first delay is selected from the main lobe, there is a fairly high probability of also selecting one or more additional delays from the M delays preceding and the M delays following this first delay in the time window. These additional delays afford a gain in space diversity only if the multiple propagation paths have a concentrated distribution. Otherwise, these additional delays certainly contribute to increasing the energy received, but they afford no gain in diversity.

An object of the present invention is to propose a method of selecting the delays for a rake receiver which makes it possible efficiently to separate the contributions of the propagation paths and those of the noise so as fully to exploit the space/time diversity without increasing the noise in the demodulated output.

SUMMARY OF THE INVENTION

The invention thus proposes a method of selecting multiple propagation delays for the reception of messages transmitted in a spread spectrum radio communication system, each selected delay being applied to at least one spreading sequence in order to determine a correlation between a received signal and said spreading sequence in a reception arm of a K-arm rake receiver. The received signal is sampled at a sampling rate greater than the chip rate of the spreading sequences. Consecutive delays which are multiple of the inverse of the sampling rate are tested within a time window, by evaluating, for each tested delay, an energy of the correlation between the received signal and a reference spreading sequence to which said tested delay is applied, and the delays are selected on the basis of the distribution of the energies evaluated with respect to the tested delays. The method comprises steps /a/ to /d/ below:

/a/ determining a selection threshold from the largest of the energies evaluated with respect to the delays tested within the time window;

/b/ constructing a first list of delays and a second list of delays, the first list containing delays from the window for which the histogram of the evaluated energies versus the delays exhibits a local maximum greater than the selection threshold, and the second list containing delays which are each neighbours of at least one delay from the first list;

/c/ if the number of delays in the first list is equal to or greater than the number K of arms in the rake receiver, selecting the K delays from the first list for which the evaluated energies are largest;

/d/ if the number of delays in the first list is less than the number of arms in the rake receiver, selecting the delays from the first list and at least one delay from the second list for which the evaluated energy is greater than the selection threshold.

In this way, the selection procedure favours the delays in the first list, which correspond in general to distinct propagation paths. The second list is ultimately explored, in order to increase the received power without necessarily contributing to reception diversity, only if the number of delays selected from the first list is insufficient for the K arms of the rake receiver.

The diversity of the multiple paths can thus be better exploited, particularly when the number of arms in the rake receiver is limited by reason of restrictions on the hardware complexity and/or energy consumption of the receiver.

BRIEF DESCRIPTION OF THE DRAWINGS

FIGS. 3 to 10 are histograms illustrating a method of selecting delays according to the invention.

DESCRIPTION OF A PREFERRED EMBODIMENT

In a cellular radio telephony system, base stations are distributed over the territory to be covered. In the region, or cell, covered by a base station, several mobile stations may communicate simultaneously with the base station. The process according to the invention is described below in its application to the downlinks, that is to say to the transmission of the signals from a base station to mobile stations, for which code division multiple access (CDMA) is used.

Each base station sets up CDMA transmission channels each defined by a respective spreading sequence CP, C1, . . . , Cx. The spreading sequences are for example complex, with real and imaginary parts each taking the values +1 or −1. These sequences are periodic, pseudo-random and almost uncorrelated. They have a chip rate $f_c=1/T_c$ greater than the bit rate $f_b=1/T_b$ of the information bits to be transmitted, for example a rate of 5 MHz. In each CDMA voice communication channel, the information bits to be transmitted, which represent voice or data signals previously coded by conventional techniques, are multiplied by the spreading sequence C1, . . . , Cx produced by an appropriate generator. Each of the sequences C1, . . . , Cx is characteristic of the user (mobile station) with which the communication is performed over the corresponding channel.

One of the CDMA channels formed by the base station is a pilot channel, on which a reference spreading sequence CP is emitted, with no modulation of information bits.

The baseband spread spectrum signals formed in the various CDMA channels are combined and then modulated on a carrier frequency. Combination consists in a summation, possibly weighted, of the baseband signals. The modulation can be bi-phase or quadrature phase shift keying (BPSK or QPSK). The carrier frequency is for example 2.4 GHz. The radio signal obtained after modulation is emitted by the base station towards the mobile stations located in the cell.

Figure 1:
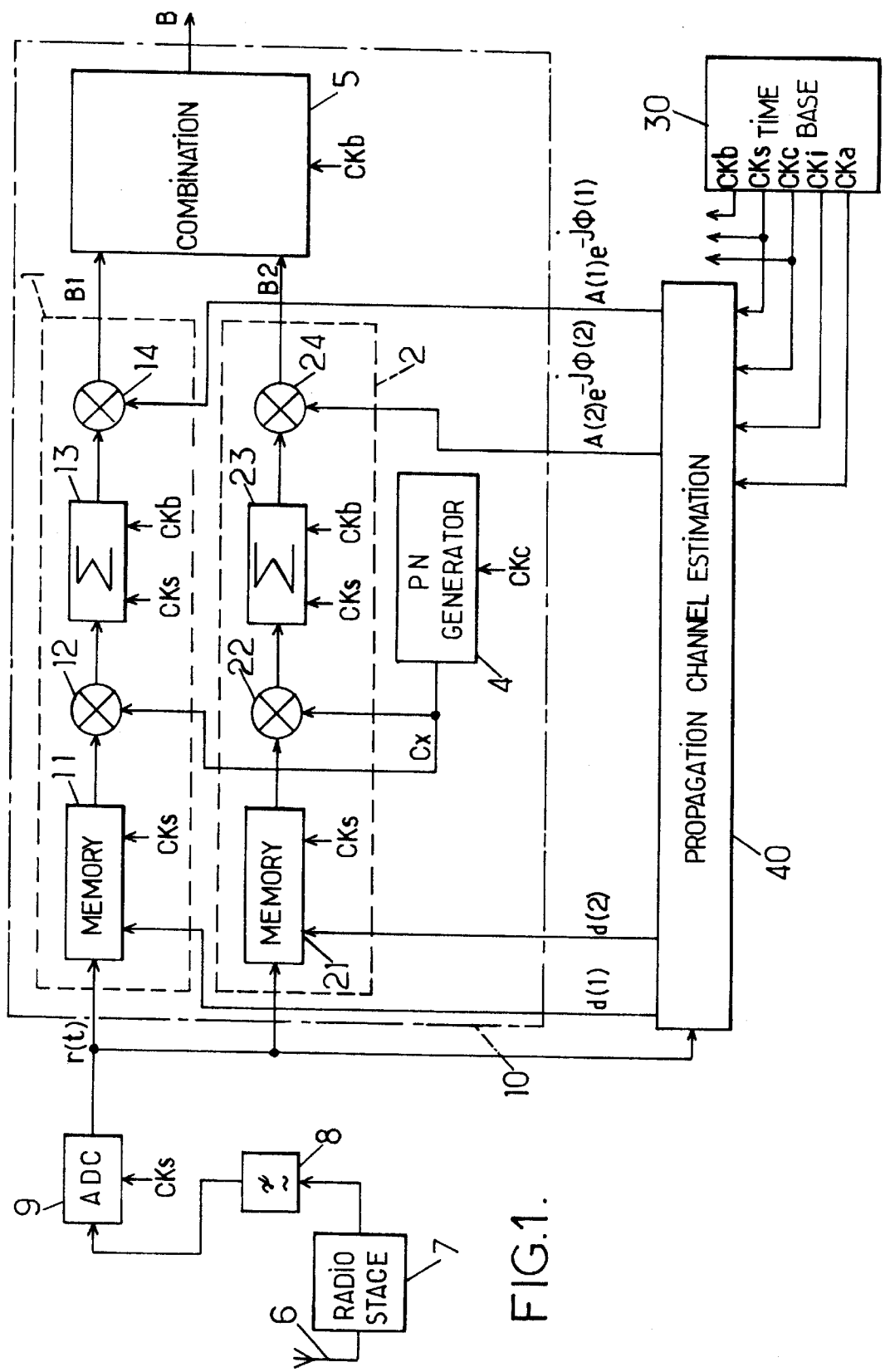
FIG. 1 is a diagram of a CDMA receiver implementing the invention.

A receiver of a mobile station is represented in FIG. 1. The radio signal received on the antenna 6 is firstly processed by the radio stage 7 to yield a baseband complex signal. This complex signal is subjected to a low-pass filtering 8 and then digitized by the analogue/digital converter 9 at a sampling rate $f_s$ greater than the chip rate $f_c$ of the spreading sequences: $f_s=M \cdot f_c$, with M>1, M generally being an integer, typically M=2 or 4. The CDMA components emitted by the base station on various CDMA channels are included in the output signal r(t) from the converter 9. The mobile station can retrieve the information bits intended for it by calculating the correlations between the signal r and the spreading sequence Cx specific to it.

The receiver of the mobile station comprises a rake receiver 10. In the example represented, the rake receiver 10 contains K=2 data reception arms 1, 2. Each reception arm 1, 2 provides for the reception of the signal along a propagation path identified by a delay d(1), d(2). The delays d(1), d(2) are assigned to the reception arms 1, 2 by an estimation unit 40 of the propagation channel. The rake receiver 10 moreover includes a pseudo-random generator 4 which delivers the receiver-specific spreading sequence Cx to the arms 1, 2, and a combining unit 5 which receives the signals B1, B2 delivered by the reception arms so as to deduce therefrom a weighted estimation B of the information bits received.

A time base 30 supplies the elements of the receiver with various clock signals obtained by frequency division using a crystal oscillator, namely:

$CK_s$, sampling clock of period $T_s$ supplied to the analogue/digital converter 9;

$CK_c$, chip clock giving the chip rate of the spreading sequences, of period $T_c=M \cdot T_s$;

$CK_b$, bit clock giving the bit rate of the information bits, of period $T_b=M_b \cdot T_s$;

$CK_i$, clock supplied to the propagation channel estimation unit 40, of period $T_i=M_i \cdot T_s$, fixing the integration time $T_i$ used to estimate the complex impulse response of the propagation channel, and the updating period for the complex amplitudes $A(k)e^{j\phi(k)}$ supplied to the arms of the rake receiver in order to provide for coherent demodulation;

$CK_a$, clock supplied to the unit 40, of period $T_a=M_a \cdot T_s$, fixing the update period for the propagation delays d(k) supplied to the arms of the rake receiver.

Each arm 1, 2 of the rake receiver comprises a correlator formed, in the example represented, by a buffer memory 11, 21, a complex multiplier 12, 22 and a summator-accumulator 13, 23. The buffer memory 11, 21 is sized so as to receive P successive samples of the received signal r(t), P·$T_s$ being the range of possible variation of the propagation delays, which is defined as a function of the maximum size of the cells of the network. For example, for a sampling frequency $f_s$ of 10 MHz, we may typically take P=1024, namely a maximum delay of the order of 100 μs corresponding to a propagation path of the order of 30 km. In write mode, the memory 11, 21 behaves like a shift register. A read is performed at each cycle of the clock $CK_s$, at an address which depends on the delay value d(k) (expressed in units of the period $T_s$). In each sampling period, the memory 11, 21 produces the value of the received signal delayed by P−d(k) sample durations $T_s$. This value is multiplied by the sample, delivered by the generator 4, of the spreading sequence Cx. The initial position of the generator 4 is set as a function of synchronization data received from the base station on a synchronization channel which is dual of the pilot channel (see for example EP-A-0 630 120), and by taking into account a constant delay of P/M chips, so that the delay between the spreading sequence and the signal with which it is correlated in the arm k is properly (P/M)$T_c$−[P−d(k)]$T_s$=d(k)·$T_s$.

The output from the multiplier 12, 22 is integrated by the summator-accumulator 13, 23 at the sampling rate $f_s$. The integration time corresponds to the duration $T_b$ of an information bit, supplied by the bit clock $CK_b$. A multiplier 14, 24 multiplies the output from the summator 13, 23 by the complex conjugate, supplied by the unit 40, of the complex amplitude A(k)$e^{j\Phi(k)}$ of the response of the propagation channel along the path corresponding to the delay d(k). At each bit time, the output from the multiplier 14, 24 represents an estimation B1, B2 of the bit value received along the relevant path. These estimations are combined by the unit 5 in order to build the overall estimation B.

Figure 2:
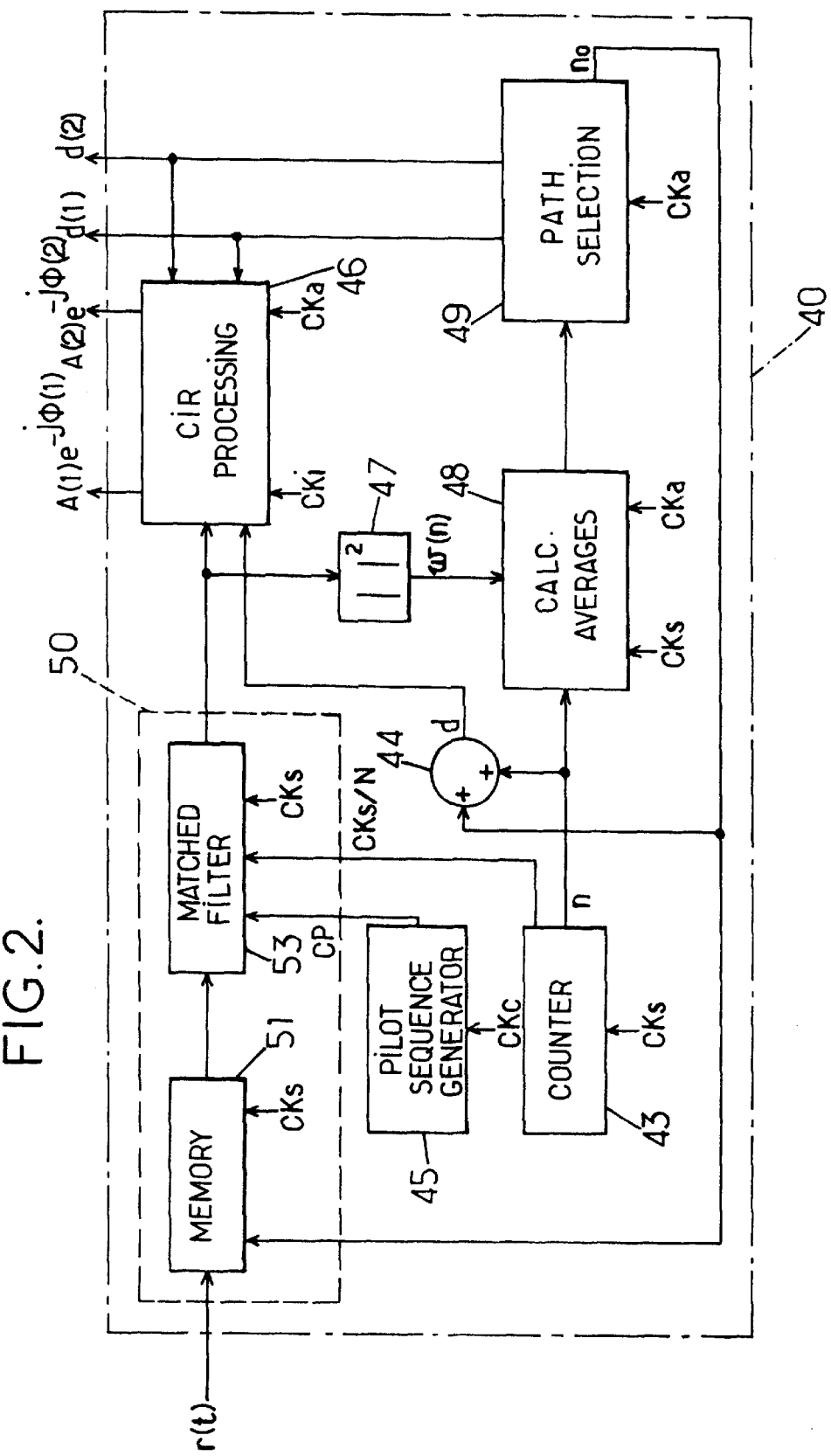
FIG. 2 is a diagram of an estimation unit of the propagation channel of the receiver of FIG. 1.

FIG. 2 shows an estimation unit 40 of the propagation channel, usable in the receiver of FIG. 1. This unit 40 comprises a sliding correlator 50 which determines the correlations between the signal received r(t) and the reference sequence CP affected by a delay varying in an N-delay search time window enclosed within the P-delay range. In the example represented, the sliding correlator 50 includes a buffer memory 51 identical to the memories 11, 21 of the arms of the rake receiver 10, and a matched filter 53 with a length of $M_i$ samples. A counter 43 over $\log_2 N$ bits (here it is assumed that N is a power of 2, for example N=128) delivers the index n of the tested delay, incremented by one unit in each period of the clock $CK_s$ (0≦n<N). This index n is added, in 44, to an integer $n_o$ determining the position of the smallest delay $n_o·T_s$ in the search window, in order to obtain the sum d=$n_o$+n representing the tested delay. The integer $n_o$ is supplied to the memory 51 so that the latter may deliver the sample of the received signal r(t) with a delay of P−$n_o$ samples.

The reference sequence CP is supplied to the matched filter 53 by the generator 45 at the chip rate given by the clock $CK_c$, with a fixed delay of P/M chips. With each overflow of the counter 43, the latter delivers a pulse $CK_s/N$ to the matched filter 53 in order to update the coefficients of the matched filter 53. Thus, during the ith cycle of the signal $CK_s/N$ of period $NT_s$, that is to say between the instants t=$iNT_s$ and t=(i+1)$NT_s$, the $M_i$ coefficients of the matched filter 53 are the samples of the reference sequence CP at the sampling instants (iN−P−$M_i$+1)$T_s$ to (iN−P)$T_s$. At the instant t=(iN+n)$T_s$, the matched filter delivers the correlation:

$$\sum_{j=0}^{M_i-1} r[t-(P-n_o+j)T_s]^* CP[(iN-P-j)T_s] =$$

$$\sum_{j=0}^{M_i-1} r(t'-jT_s)^* CP(t'-jT_s-dT_s)$$

with t'=T−(P−$n_o$)$T_s$. The delay d=$n_o$+n is therefore properly tested when the counter 43 displays the value n, by calculating a correlation between the input signal r and the pilot sequence CP over an integration time $T_i$=$M_i·T_s$.

The correlation delivered by the sliding correlator 50 when the counter 43 displays the value n is an estimation of the complex amplitude A(n)$e^{j\Phi(n)}$ of the response of the propagation channel for the propagation delay of ($n_o$+n)$T_s$. This complex amplitude is stored at the address d=$n_o$+n of a memory included within a unit 46 for processing the complex impulse response (CIR), possibly after suitable processing (filtering, conjugation, multiplication by a scale factor). The unit 46 knows the relative delays d(k) applied to the arms of the rake receiver 10, and is thus able to read from its memory at the addresses d(k) the values of the complex amplitudes supplied to the multipliers 14, 24 of the arms of the receiver. The frequency of updating the complex amplitudes is, in the case illustrated in FIG. 2 in which the delays are tested by means of a matched filter, equal to the frequency of the clock $CK_i$ giving the integration time $T_i$.

The output from the multiplier 53 is moreover supplied to an element 47 which calculates its modulus squared and supplies it to a unit 48 for calculating mean values. In each period of the clock $CK_s$, the unit 48 receives the relative value n of the tested delay and an estimation w(n) of the energy of the correlation between the signal received and the reference sequence affected by this delay. This estimation w(n) is the modulus squared supplied by the element 47, the duration of estimation of the energy being the period $T_i$ of the clock $CK_i$. For each value of n (0≦n<N), the unit 48 accumulates several successive values of the estimation w(n) in order to obtain an average W(n) thereof. The accumulation variables are reset to zero at the beginning of each cycle of the clock $CK_a$. At the end of each cycle of the clock $CK_a$, the unit 48 for calculating mean values makes the averages W(n) available to a path selection unit 49. The average W(n) is an evaluation of the energy received in respect of the relative delay n, obtained by averaging $M_a/M_i$ successive values of the estimation W(n). It is on the basis of the evaluated energies W(n) that the unit 49 selects the delays d(k). Once these delays have been selected, the unit 49 supplies them to the arms of the rake receiver 10 and to the unit 46 for processing the CIR.

The propagation delays d(k) are in general stable over longer times than the complex amplitudes A(k)$e^{j\Phi(k)}$. The estimation unit 40 of FIG. 2 allows this to be taken into account by retaining an update period $T_i$ for the complex amplitudes which is shorter than the update period $T_a$ for the delays, for example $T_a$~10 ms and $T_i$~250 μs, corresponding to $M_a/M_i$~40 estimations w(n) taken into account for each evaluated energy W(n).

Figure 3:
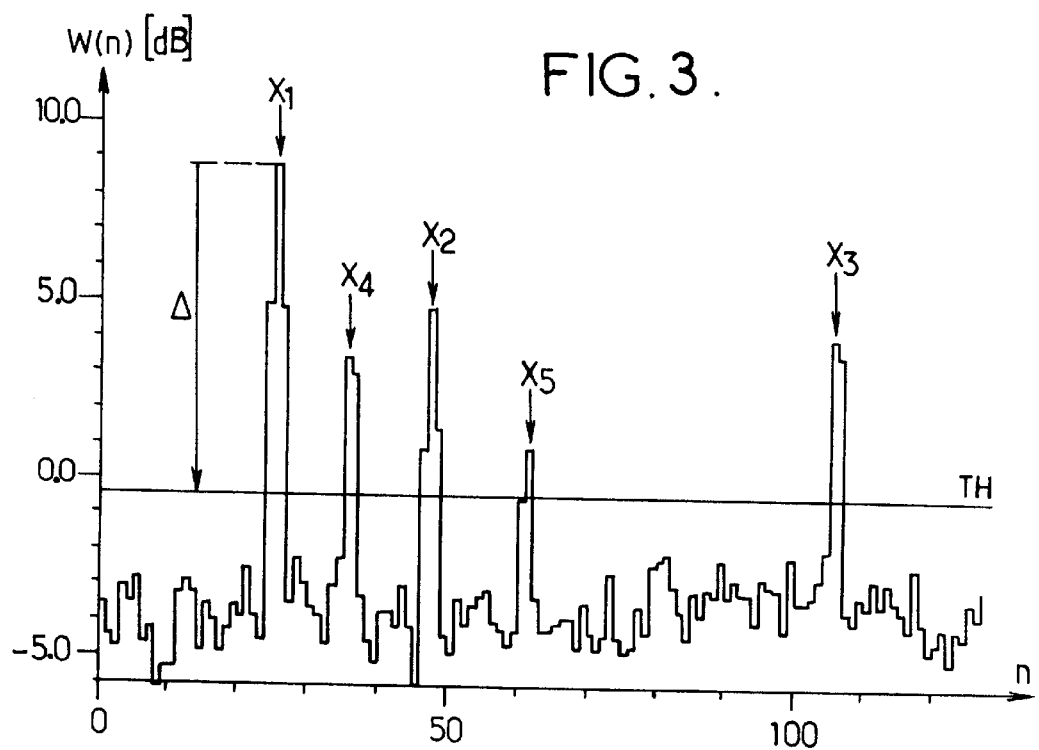

FIGS. 3 to 9 illustrate a procedure for selecting the delays on the basis of the energies W(n) evaluated during an update period of duration $T_a$ in a particular case where K=4, M=2, N=128. FIG. 3 shows an example of a histogram of W(n) supplied to the path selection unit 49 by the unit 48 for calculating averages. A selection threshold TH is firstly defined by deducting a margin Δ from the largest value of W(n), expressed in decibels. The delay n=25 for which the energy W(n) is largest is included in a first initially empty list L1. M=2 neighbouring delays (n=24 and n=26) are included in a second initially empty list L2.

A propagation path is manifested by a peak X1–X5 in the histogram of the energies, the width of which corresponds to M+1 samples, or to M samples in the particular case in which the delay is very close to an odd integer multiple of half the sampling period $T_s$ (the case of the peaks X3 and X4 in FIG. 3). In the particular case where M=2, a peak of width of M+1=3 generally exhibits a maximum for the central sample n (coincidence between the two chip values over the whole duration of the sample) and a relatively high value again for the samples n−1 and n+1 (coincidence between the two chip values over part only of the duration of the sample). It is therefore appropriate to take the delays n−1 and n+1 as the two "neighbours" to be included in the list L2. If the peak has a width M=2 only, one of the two delays included in the list L2 represents a low-energy correlation, but this delay will ultimately have a low probability of being selected.

If M>2, the chip values coincide over M−1≧2 consecutive sample durations, so that the energy maximum does not necessarily correspond to the centre of the peak. One possibility is to retain as "neighbours" the M/2 delays preceding and the M/2 delays following the delay for which the energy is a maximum. It is also possible to analyse the shape of the peak so that more neighbours may be taken from one side of the maximum than from the other in order to take account of the cases in which the maximum in the peak is not central. In all cases, a delay "neighbouring" another delay is at most M−1 samples distant from this other delay.

In an alternative embodiment, a neighbouring delay is included in the second list L2 only on condition that the energy evaluated in respect of this delay is greater than the threshold TH. This does not change the delays which will ultimately be selected since the energy evaluated with respect to a selected delay should always be greater than the threshold.

Figure 4:
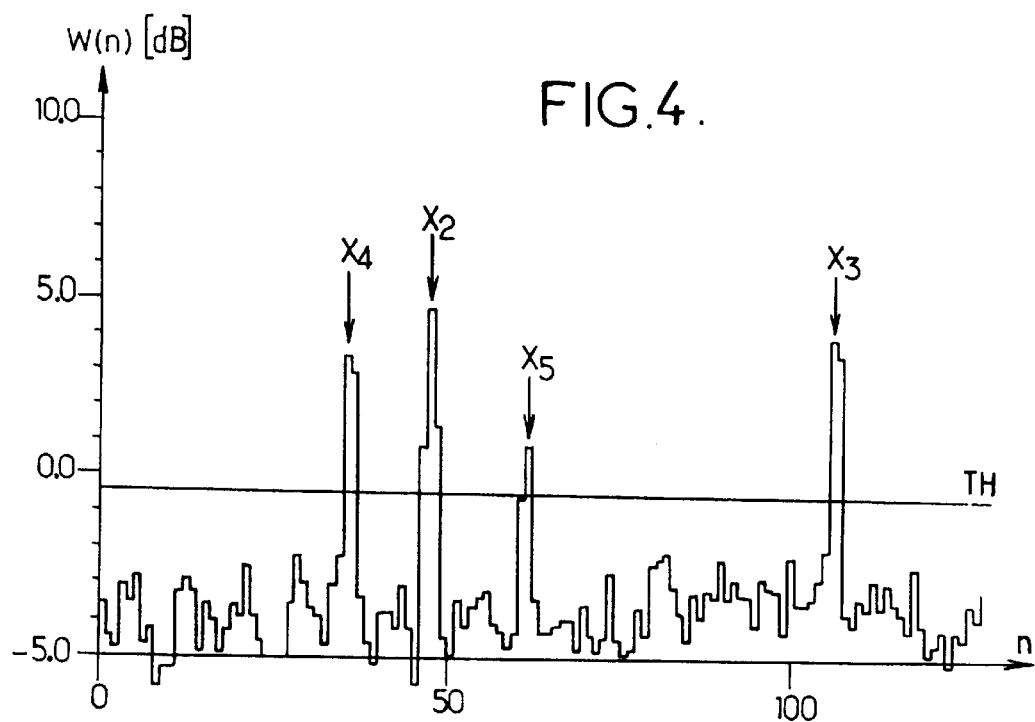

Once the first delay has been included in the list L1 and its neighbours in the list L2, these M+1 delays are deleted from the histogram n,W(n) (FIG. 4). We then search for the remaining delay for which the energy W(n) is a maximum (n=47 in the example represented). If this maximum is greater than the threshold TH, this delay is included in the list L1 and its M=2 neighbours (n=46 and n=48) are included in the list L2.

Figure 7:
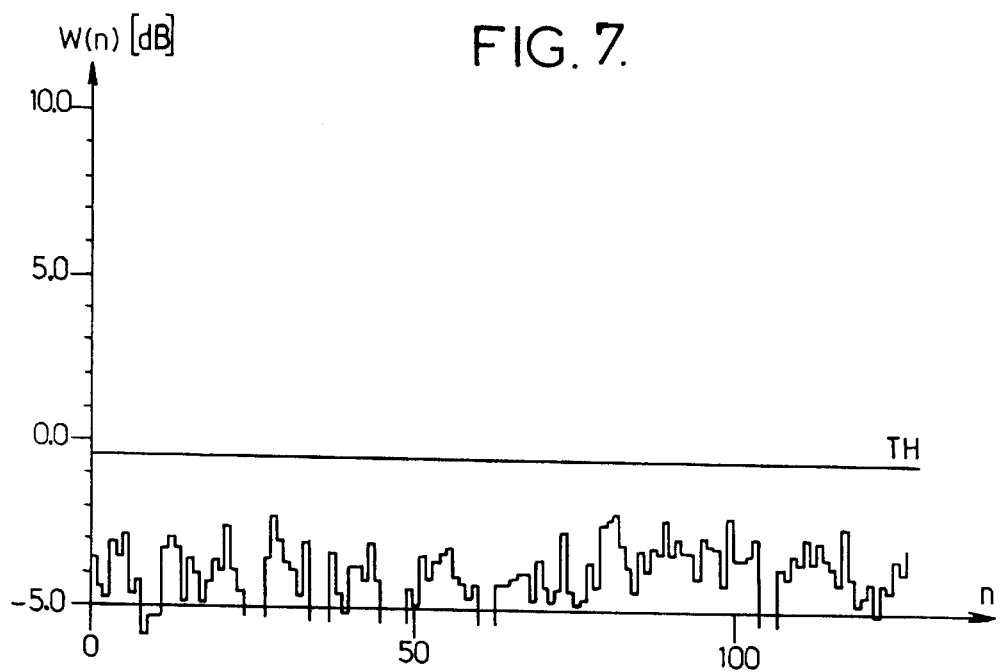
Figure 8:
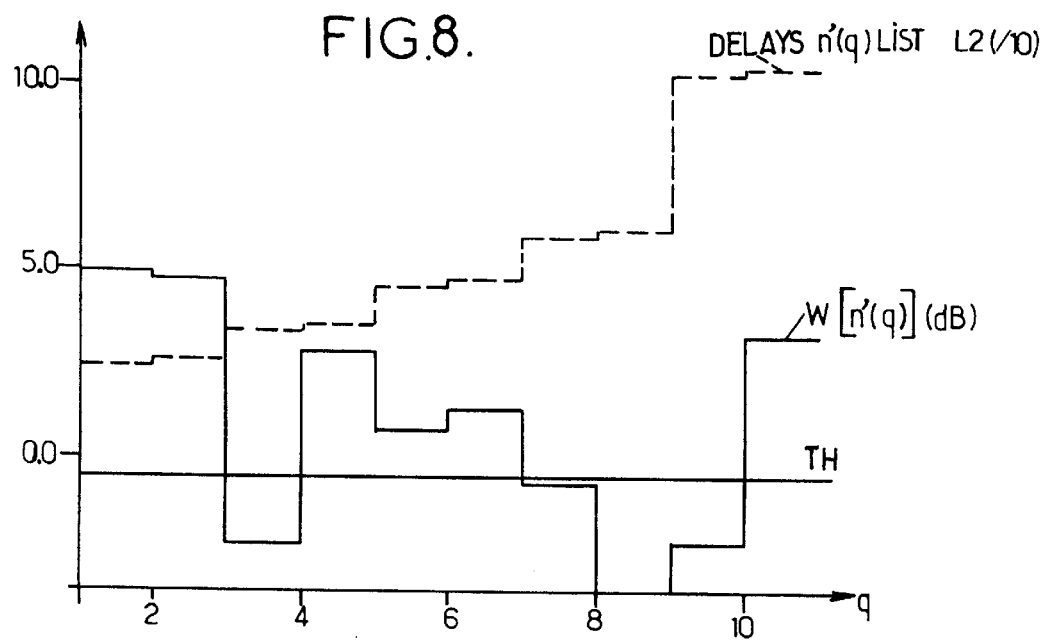

The lists construction procedure mentioned in the previous paragraph is repeated until the histogram n, W(n) no longer exhibits any energy greater than the threshold TH (FIG. 7). FIGS. 5, 6 and 7 show the histogram n, W(n) after 2, 4 and 5 iterations respectively. FIG. 8 shows the ultimate contents of the second list L2, the 10 delays being arranged in ascending order.

The selection of the delays is firstly performed from the first list L1. If this list L1 does not contain sufficient delays for the K arms of the rake receiver, the second list L2 is examined so as to select other delays therefrom.

Figure 9:
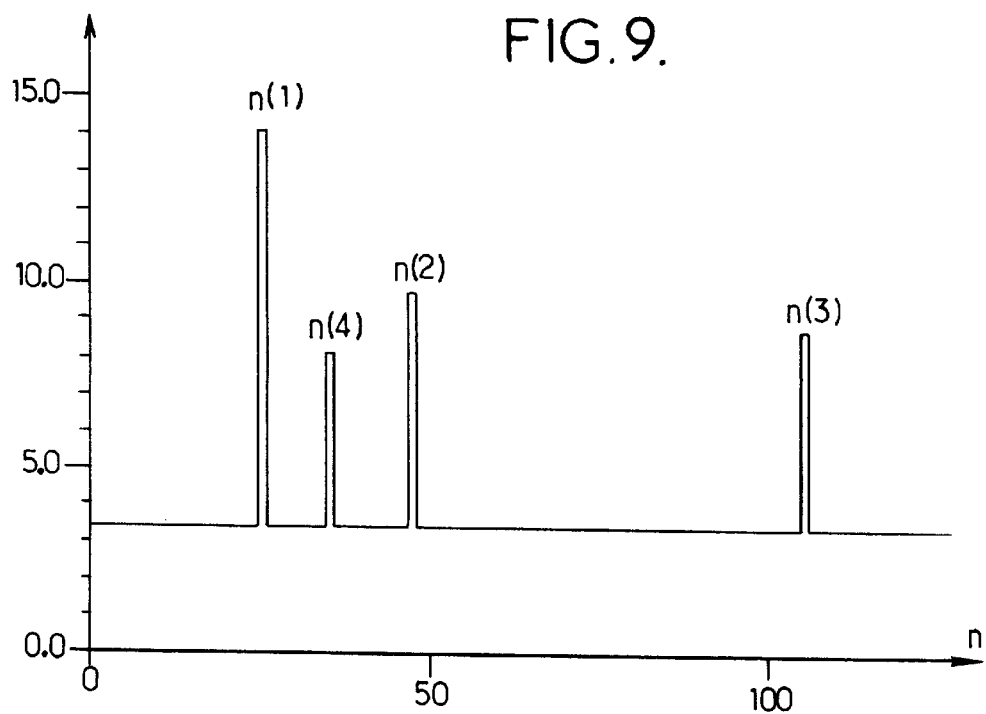

In the case of FIG. 9, the rake receiver includes K=4 arms. With the list L1 containing 5 delays, the first 4, n(1) to n(4), are selected, that is to say those for which the energies W(n) are largest.

Figure 10:
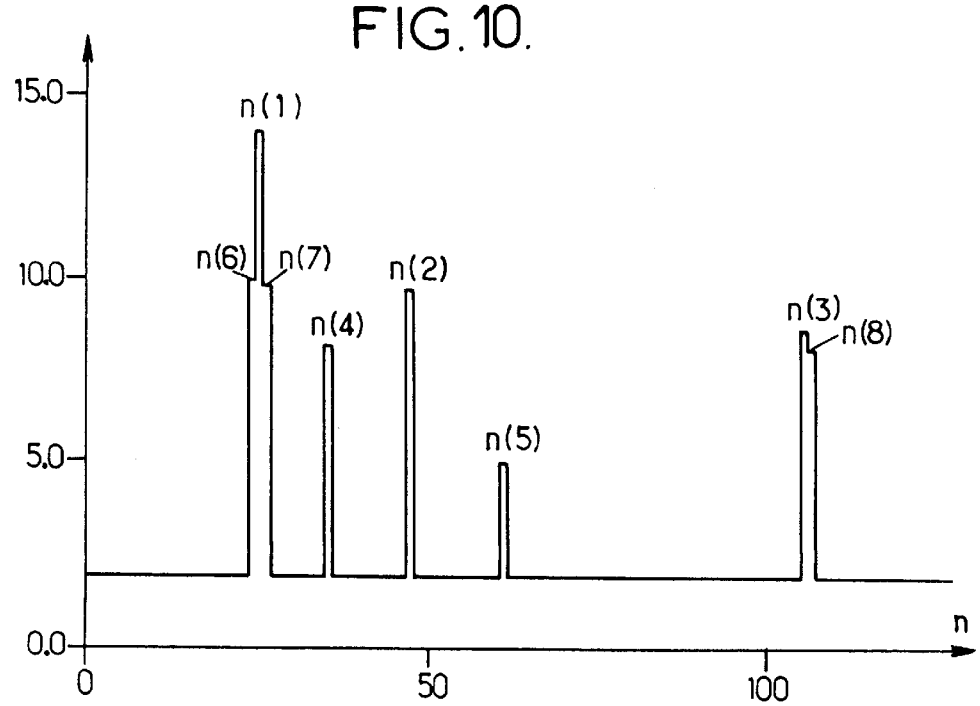

In the case of FIG. 10, the rake receiver includes K=8 arms. The 5 delays n(1) to n(5) from the list L1 are selected, as are the 3 delays n(6) to n(8) from the list L2 for which the energies W(n) are largest.

The absolute delays d(k) ultimately assigned by the unit 49 to the arms of the receiver are the relative delays n(k) increased by the position $n_0$ of the first sample from the search window.

Note that, in the case of FIG. 10, the selected delays n(1) to n(8) correspond to the 8 delays for which the energies are the largest at the start (FIG. 3). In this particular case the selection procedure leads to the same result as a conventional procedure based only on the energy levels. However, in the case of FIG. 9, where the number of arms is smaller, 4 delays are selected corresponding to 4 distinct paths, whereas the conventional procedure would lead to the selection of the delays n=24, 25, 26 and 47, including 3 neighbouring delays which are probably due to the same propagation path. The invention therefore makes it possible to derive greater benefit from the diversity in reception when the number of arms is limited.

Figure 11:
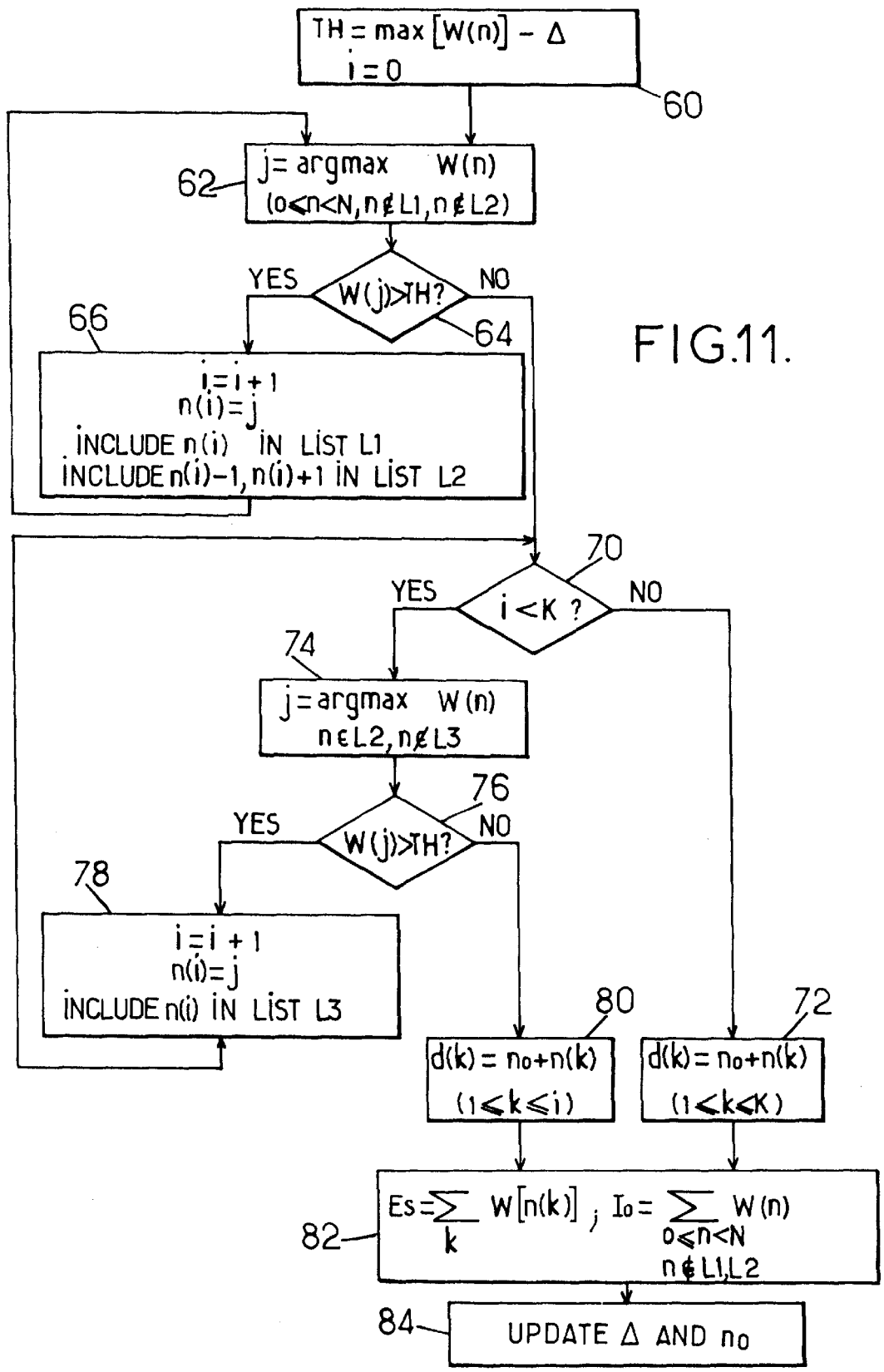
FIG. 11 is a flowchart illustrating a way of executing such method.

FIG. 11 shows an example of a flowchart for the procedure for selecting the delays from the histogram n,W(n) obtained over a period $T_a$. In the first step 60, the unit 49 calculates the threshold TH by deducting the margin Δ from the largest of the energies W(n) over the window, and initializes the integer i to 0. A loop 62, 64, 66 is then executed several times to construct the initially empty lists L1 and L2. In step 62, the delay j is determined for which the evaluated energy is the largest in the search window with the exclusion of the delays in the lists L1 and L2. This largest energy is compared with the threshold TH in step 64. If the comparison 64 shows that W(j)>TH, step 66 is executed before returning to step 62. In step 66, the integer i is incremented by one unit and the delay n(i) is taken equal to the integer j which previously maximized the energy. The delay n(i) is included in the list L1, and the neighbouring delays (n(i)−1 and n(i)+1 in the case where M=2) are included in the list L2.

When the comparison 64 shows that W(j)≦TH, the loop 62, 64, 66 is exited, the lists L1 and L2 then being complete. The number i of delays in the first list is compared, at 70, with the number K of arms in the rake receiver. If i≧K, the first K delays in the first list L1 are selected in step 72, the absolute delays d(k) being obtained for 1≦k≦K from d(k)=$n_o$+n(k). If the first comparison 70 shows that i<K, the first list L1 does not contain sufficient delays for the K arms of the receiver, and the second list L2 is processed in a loop 74, 76, 78, 70. In step 74 the delay j is determined for which the evaluated energy is the largest in the list L2, with the exclusion of an initially empty list L3. In step 76, the maximized energy W(j) is compared with the threshold TH. If W(j)>TH, step 78 is executed before returning to the comparison step 70. In step 78, the integer i is incremented by one unit, and the delay n(i) is taken equal to the integer j which previously maximized the energy. The delay n(i) is included in the list L3. When the comparison 70 shows that i=K, K delays are selected in step 72, namely all the delays in the list L1 and one or more delays in the list L2 (those for which the energies are the largest). If an instance of the comparison 76 shows that W(j)≦TH, the second list L2 does not contain sufficient delays greater than the threshold TH to supply a total of K delays together with those from the first list. In this case, the delays are selected in step 80, equal in number to the current value of the integer i.

Once the delays have been selected in step 72 or 80, the unit 49 calculates two quantities $E_s$ and $I_o$ in step 82 and then determines, in step 84, the parameters Δ and $n_o$ for the following period $T_a$. The new position $n_o$ of the search window is determined from the distribution of the delays which have just been selected. A simple possibility is to take $n_o$ equal to the smallest of the delays d(k), less a constant value. More sophisticated algorithms can, however, be applied in order to position the window.

The margin Δ is determined on the basis of estimations of the signal-to-interferers ratio (SIR). The overall energy received $E_s$ has been determined in step 82 by summing the energies W[n(k)] evaluated in respect of the delays n(k) retained in step 72 or 80, whereas the power density $I_o$ of the interferers has been determined by summing the energies W(n) evaluated in respect of those delays in the search window which are not included in the lists L1 and L2. The quotient $E_s/I_o$ represents an estimation of the signal-to-interferers ratio in each period $T_a$. These estimations are subjected to low-pass filtering, and the margin Δ is taken equal to the filtered estimation $E_s/I_o$ multiplied by a predetermined coefficient.

By way of illustration, the applicant has tested the process in a particular case in which the sampling rate $f_s$ was 10 MHz, for a chip rate of 5 Mchips/s (M=2). The search window covered N=128 samples, i.e. 12.8 μs. In the sliding correlator, the integration time $T_i$ corresponded to $M_i$=2,560 samples or 3,280 chips. The update period for the complex amplitudes was equal to the integration time $T_i$, i.e. 256 μs. The update period $T_a$ for the delays was 10.24 ms ($M_a$= 102,400). $M_a/M_i$=40 estimations w(n) were taken into account in evaluating the energies W(n). With a receiver with K=4 arms, the applicant has observed better exploitation of the delays corresponding to paths other than that having the highest energy, in contrast to the conventional receivers which have too great a tendency simultaneously to select several neighbouring delays corresponding to the path of highest energy.

The invention has been described above in an illustrative application to the downlinks of a radio telephone system. It can of course be applied in similar fashion to the uplinks when the receiver of the base station includes a diversity receiver (see U.S. Pat. No. 5,109,390). In this case, the reference sequence used in the calculation of the reception energies is no longer a sequence emitted over a pilot channel, but rather the spreading sequence serving for the communications.

I claim:

1. A method of selecting multiple propagation delays for the reception of messages transmitted in a spread spectrum radio communication system, each selected delay being applied to at least one spreading sequence in order to determine a correlation between a received signal and said spreading sequence in a reception arm of a K-arms rake receiver, wherein the received signal is sampled at a sampling rate greater than a chip rate of the spreading sequences, said method comprising testing consecutive delays which are multiple of the inverse of the sampling rate within a time window, by evaluating, for each tested delay, an energy of a correlation between the received signal and a reference spreading sequence to which said tested delay is applied, and selecting the delays on the basis of the distribution of the energies evaluated in respect of the tested delays, and wherein the selection of the delays comprises the steps of:

/a/ determining a selection threshold from the largest of the energies evaluated with respect to the delays tested within the time window;

/b/ constructing a first list of delays and a second list of delays, the first list containing delays from the window for which a histogram of the evaluated energies versus the delays exhibits a local maximum greater than the selection threshold, and the second list containing delays which are each neighbours of at least one delay from the first list;

/c/ if the number of delays in the first list is equal to or greater than the number K of arms in the rake receiver, selecting the K delays from the first list for which the evaluated energies are largest;

/d/ if the number of delays in the first list is less than the number of arms in the rake receiver, selecting the delays from the first list and at least one delay from the second list for which the evaluated energy is greater than the selection threshold.

2. A method according, to claim 1, wherein the sampling rate is equal to M times the chip rate of the spreading sequences, M being an integer larger than 1, and wherein each delay in the second list is at most M−1 samples distant from a delay in the first list.

3. A method according to claim 2, wherein step /b/ of constructing the lists comprises, starting from initially empty lists, several iterations of the succession of the following sub-steps:

/b1/ determining the tested delay, from among the delays in the time window with the exclusion of the delays in the first and second lists, for which the evaluated energy is largest;

/b2/ comparing the evaluated energy with respect to the delay determined in sub-step /b1/ with the selection threshold; and /b3/ if sub-step /b2/ shows an energy greater than the selection threshold, including in the first list the delay determined in sub-step /b1/, and including in the second list at least each delay, from among M delays neighbouring the delay determined in sub-step /b1/, for which the evaluated energy is greater than the selection threshold.

4. A method according to claim 3, wherein, M being an even integer, said M delays neighbouring a delay determined in sub-step /b1/, from among which at least one delay is included in the second list in the next sub-step /b3/, are the M/2 delays preceding and the M/2 delays following said delay determined in sub-step /b1/.

5. A method according to claim 1, wherein the lists are constructed in step /b/ in such a way that none of the energies evaluated with respect to the delays in the time window with the exclusion of the delays from the first and second lists is greater than the selection threshold, the method furthermore comprising a step of estimating a signal-to-interferers ratio based on a quotient between on the one hand the sum of the energies evaluated with respect to the delays selected in step /c/ or step /d/ and on the other hand the sum of the energies evaluated in respect of the delays in the time window with the exclusion of the delays from the first and second lists.

6. A method according to claim 5, wherein the delays are selected per successive update periods of $M_a$ samples, and wherein the selection threshold determined in step /a/ for an update period is calculated as a function of the largest of the energies evaluated with respect to the delays tested within the time window during said update period and of the previously estimated signal-to-interferers ratio.

7. A method according to claim 1, wherein each arm of the rake receiver is arranged to perform a coherent demodulation with respect to the propagation delay assigned thereto, on the basis of an estimation of a complex reception amplitude associated with said delay, and wherein the estimations of the complex amplitudes are updated at a frequency higher than the frequency of updating the delays.

* * * * *